Jan. 14, 1941.     I. J. STARWORTH     2,228,736
GLOBE
Filed June 22, 1939

INVENTOR
IRVING J. STARWORTH
BY *Milton Zucker*
ATTORNEY

Patented Jan. 14, 1941

2,228,736

UNITED STATES PATENT OFFICE 2,228,736

GLOBE

Irving J. Starworth, New York, N. Y.

Application June 22, 1939, Serial No. 280,464

8 Claims. (Cl. 35—46)

This invention relates to the art of cartography, and is directed particularly to a knockdown globe characterized by its accuracy, low cost and ease of assembly.

In the manufacture of terrestrial and celestial globes, where an accurate representation of the earth or heavens is desired, it has been conventional practice to prepare a sphere of metal, wood, plaster, plastic or other base material, and a skin of paper or parchment, printed flat and then cut to shapes approximating segments of the finished globe. The skin is then applied to the sphere and secured to it by means of an adhesive. Proper application requires skilled hand labor, so that the cost of globes increases with the accuracy of the representation and the size of the ball. Once the skin is applied, changes cannot be made except by applying a new skin. Since changes in the map of the world occur frequently, the market for these expensive globes, which cannot be brought up to date, is obviously rather limited.

Cheap, inaccurate novelty globes have been made by lithographing metal, then drawing the metal into hemispherical shape, and joining the hemispheres. Such globes have been mere caricatures of a reproduction of the earth's surface, since metal does not flow evenly on a deep draw.

Attempts have also been made to provide sectional globes, each section comprising a base material and a skin; but these globes are more expensive to make than the conventional globes, and are essentially just as expensive to change as the map of the world changes.

I have devised a globe which is inexpensive to make, which accurately reproduces the earth's surface, which can be assembled and disassembled easily, and which can be readily revised as the appearance of the earth changes. My globe comprises a plurality of sections, including two end members (preferably comprising polar caps) and connecting side members adapted to be locked to each other and to the end members, arranged to make a complete sphere when assembled. An essential feature of my invention is that the members are made of readily deformable material such as sheet metal or plastic. These members are originally printed flat, and are then cut and formed to the necessary shape. Preferably, the members are of sheet metal, and are rolled in one direction to form a section of a cylinder, and then drawn in the other direction to obtain the desired sphere-segment shape, to minimize deformation. The area of any single member represents such a small fraction of the total area of the sphere that no substantial distortion of the printed metal is obtained, as with large segments that must necessarily be subjected to deep draws.

A preferred embodiment of my invention is shown in the accompanying drawing, in which—

Figure 1:
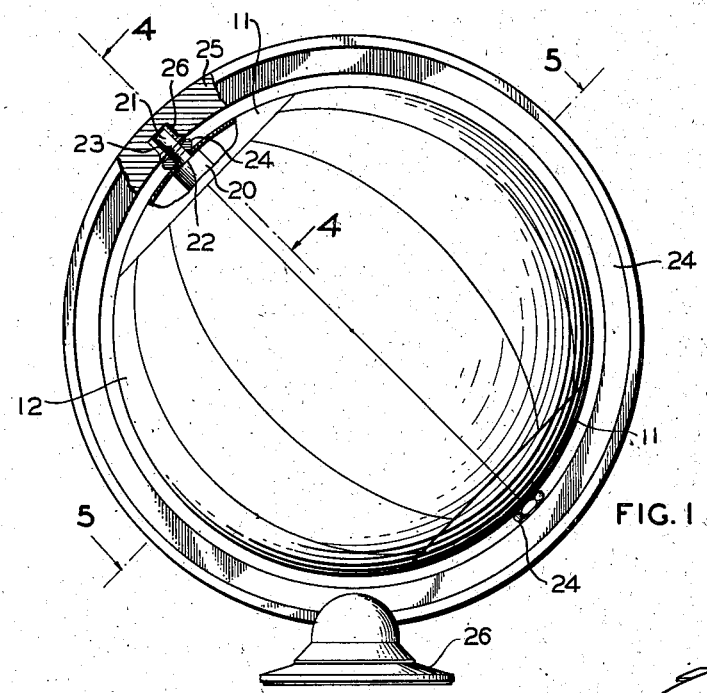
Fig. 1 is an elevation of my improved globe, assembled and mounted, with a portion cut away to disclose the use of the polar axis to lock the members in place.
Figure 2:
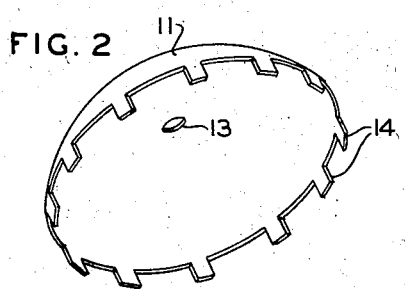
Fig. 2 is a perspective view of one of the end members.
Figure 3:
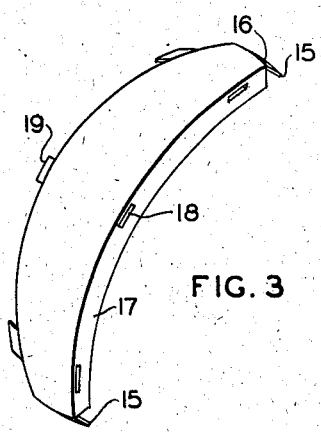
Fig. 3 is a perspective view of one of the side members.

Referring to the drawing, my globe comprises a pair of end members 11, preferably corresponding to all or a portion of the polar regions in the case of a terrestrial globe, and a plurality of side members 12. For the sake of convenience, I use twelve of these side members, each corresponding to 30° of longitude of the earth's surface between the arctic and antarctic circles, so that the joints between them correspond to the prime circles of longitude. Each of the top members has a hole 13 at the pole, and a plurality of tongues 14 depending from the base of the member, at least equal in number to the number of side members. The side members have top and bottom flanges 15, having slots 16 therein into which the tongues 14 fit. Flanges 17, having slots 18, are integral with the side members 12, as are sets of tongues 19, corresponding to the slots 18. A polar axis 20 is provided, larger in diameter than the holes 13, with reduced extensions 21 fitting through the holes, providing shoulders 22 on which the pole caps may rest. The extensions have threaded portions 23, for a portion of their length.

Figure 5:
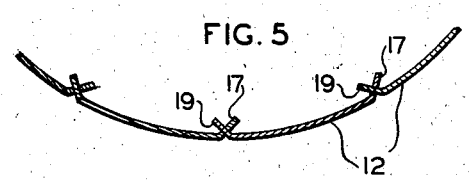
Fig. 5 is a partial section along the line 5—5 of Fig. 1, showing the method of uniting the side members to each other.
Figure 4:
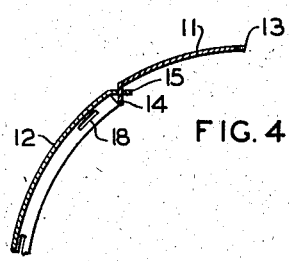
Fig. 4 is a partial section along the line 4—4 of Fig. 1, showing the method of uniting the end members to the side members.

In the assemblage of the device, the side portions are first assembled, as shown in Fig. 5. The tongues 19, set at an angle of 45° to the tangent at the edge of the side piece, are inserted into the slots 18 on the flanges 17, which are also set at an angle of 45° to the tangent. The tongues thus pass into the slots at a 90° angle, insuring proper fit. If desired, the tongues may be bent back onto the flanges, to lock the sections together temporarily. One of the polar sections is then placed on the assembly, in the manner shown in Fig. 4; the tongues 14, set parallel to the polar axis, are placed into the slot 16 in the flanges 15, which are set perpendicular to the axis, to insure a 90° joint. The polar axis is then inserted in one hole 14, and the second pole cap is placed on the assembly, with the hole 13 resting on the shoulder 22, and the tongues 14 in the proper slots. Nuts 24, threaded inwardly, are then screwed onto the threaded portions 23 of the extensions 21, thus locking the pole caps onto the side members. A resilient meridian 25 is provided with sockets 26 to hold the unthreaded ends of the polar axis extensions 21. The globe may be inserted in the meridian by pressing the meridian inwardly at the points corresponding to the equator, forcing the polar points to spring outwardly enough to allow the polar axis to be placed in proper position to fit into the sockets on release of the pressure. The meridian may then be mounted on any form of base 27, in any desired manner.

As indicated above, the parts are lithographed or otherwise printed flat, just as present day globe skins are printed. The top members, corresponding to the polar regions, are then drawn to sphere-segment shape. The distortion is not severe, since only about 23° or less of latitude is involved from crown to edge. In any case, the deepest draw and greatest distortion occurs at the poles, which are poorly mapped at best. The side members are preferably rolled to the form of a cylinder-segment extending from arctic circle to antartic circle, thus involving little if any distortion, and are then drawn in the opposite direction. Since the total draw is but 15° from crown to each edge, it is obvious that substantially no distortion occurs.

With proper care in the drawing of the metal, acceptable results may be obtained with as few as three or four side members. As the number of side members increases, the care required in drawing diminishes. With six or more members, the distortion due to normal drawing operations is not objectionable; I prefer to use twelve side members because of ease in assembly.

My device is extremely cheap to make, since no skilled hand labor is involved, and the technique of lithographing, stamping and drawing metal and working plastics is well developed. It is easy to assemble and disassemble; when a change occurs in the map of the earth, it can be easily disassembled to remove an incorrectly mapped member and reassembled with a new member showing the revision. It is thus possible to provide an inexpensive, accurate globe which can be kept up to date at no great expense.

While I have shown a preferred form of my device, involving the use of sheet metal, other forms may be substituted. For examples, the sections may be of deformable sheet plastic, which may be molded after printing, and even heat converted during the molding operation; with such material, the connecting members could be as shown, or they could be flanges which could be clipped together by spring members, or any other suitable fastenings.

My construction may be used for making either terrestrial or celestial globes. The sections can be embossed, if desired, to provide a relief globe of the world. Other uses will be obvious to those skilled in the art.

I claim:

1. A hollow sectional globe comprising two sphere-segment end-members carrying indicia thereon, a plurality of sphere-segment side-members carrying corresponding indicia and adapted to be joined together with the end-members to form a globe, the assemblage being held together in a self-supporting structure by fastening means attached to the adjacent edges of said members.

2. A hollow sectional globe comprising two sphere-segment end-members carrying indicia thereon, three or more sphere-segment side-members carrying corresponding indicia and adapted to be joined together with the end-members to form a globe, the assemblage being held together in a self-supporting structure by fastening means attached to the adjacent edges of said members.

3. A hollow sectional globe comprising two polar end-members carrying indicia thereon and having openings at the poles, and fastening means at their edges for attachment to side-members, a plurality of sphere-segment side-members carrying corresponding indicia and adapted to be joined together with the end-members to form a globe, fastening means on the edges of the side-members to connect them to each other and to the end-members for holding the assemblage together in a self-supporting structure, a polar axis extending through the holes in the end-members, and locking members on the polar axis to lock the assemblage in place.

4. A hollow sectional globe comprising two polar end-members carrying indicia thereon and having openings at the poles and fastening means at their edges for attachment to side-members, a plurality of sphere-segment side-members carrying corresponding indicia and adapted to be joined together with the end-members to form a globe, tongue and slot fastening means on the edges of the side-members to connect them to each other and to the end-members for holding the assemblage together in a self-supporting structure, a polar axis etxending through the holes in the end-members having shoulders bearing against the insides thereof, threaded extensions passing therethrough, and nuts on the extensions bearing against the outside of the end-members to lock the assemblage in place.

5. The structure of claim 4, in which the side-members are twelve in number.

6. The structure of claim 1, in which the end-members correspond to the polar regions of the terrestrial globe and carry corresponding indicia, and the side-members correspond to the remainder of the terrestrial globe.

7. The method of making a decorated globe from formable sheet material capable of maintaining its form while supporting more than its own weight after forming, which comprises applying the indicia to be borne by the globe directly onto the sheet, forming the flat material into two end-members and a plurality of side-members through a maximum draw of about 23°, and assembling the members to form a self-supporting globe.

8. The globe of claim 1 in which the indicia are in relief.

IRVING J. STARWORTH.